US012634243B2

(12) United States Patent
    Cuadra Chamorro et al.

(10) Patent No.: US 12,634,243 B2
(45) Date of Patent: May 19, 2026

(54) EFFICIENT HIGH AVAILABILITY WITHIN A NETWORK DEVICE

(71) Applicant: Hewlett Packard Enterprise Development LP, Spring, TX (US)

(72) Inventors: Pedro Joaquin Cuadra Chamorro, Puntarenas (CR); Scott Bernard Mains, Battle Ground, WA (US); Matthew Aaron Blanford, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 65 days.

(21) Appl. No.: 18/670,395

(22) Filed: May 21, 2024

(65) Prior Publication Data

US 2025/0365252 A1 Nov. 27, 2025

(51) Int. Cl.
    *H04L 12/24* (2006.01)
    *H04L 41/0803* (2022.01)
    *H04L 47/70* (2022.01)
    *H04L 47/76* (2022.01)

(52) U.S. Cl.
    CPC ............ *H04L 47/76* (2013.01); *H04L 47/826* (2013.01)

(58) Field of Classification Search
    CPC .............................. H04L 47/76; H04L 47/826
    USPC ......................................................... 709/226
    See application file for complete search history.

(56) References Cited

U.S. PATENT DOCUMENTS

| | | | | |
|---|---|---|---|---|
| 10,735,304 | B2 * | 8/2020 | Ordway | H04L 45/02 |
| 2004/0042395 | A1 * | 3/2004 | Lu | H04L 45/245 |
| | | | | 370/225 |
| 2013/0290770 | A1 * | 10/2013 | Callaway | G06F 11/1641 |
| | | | | 714/3 |
| 2017/0031820 | A1 * | 2/2017 | Axnix | G06Q 10/06 |
| 2018/0026916 | A1 * | 1/2018 | Banerjee | H04L 47/30 |
| | | | | 370/412 |
| 2019/0370376 | A1 * | 12/2019 | Demmon | G06F 11/2046 |
| 2021/0216213 | A1 * | 7/2021 | Shveidel | H04L 67/1001 |
| 2021/0336878 | A1 * | 10/2021 | Vastholil | H04L 43/20 |
| 2021/0344748 | A1 * | 11/2021 | Chen | G06F 11/2028 |

(Continued)

FOREIGN PATENT DOCUMENTS

CN 115834740 A * 3/2023

*Primary Examiner* — Moustafa M Meky
*Assistant Examiner* — Elizabeth Kassa
(74) *Attorney, Agent, or Firm* — Yao Legal Services, Inc.

(57) ABSTRACT

A network device is provided. During operation, the network device receives, from a first hardware unit of the network device, a message indicating an operation to be performed at the network device. Here, the first hardware unit includes processing resources distinct from the processing resources of the network device. The network device performs the operation at the network device based on information in the message. The network device sends an output of the operation to a second hardware unit of the network device that operates as a standby for the first hardware unit for facilitating high availability. The network device then updates the second hardware unit with the output of the operation to synchronize between the first and second hardware units via the processing resources of the network device. Subsequently, the network device provides, to the first hardware unit, an acknowledgment of the completion of the operation.

13 Claims, 11 Drawing Sheets

(56) References Cited

U.S. PATENT DOCUMENTS

| | | |
|---|---|---|
| 2024/0289349 A1 | 8/2024 | Dompe Gamboa et al. |
| 2025/0077369 A1 * | 3/2025 | Warner .............. G06F 11/1666 |

* cited by examiner

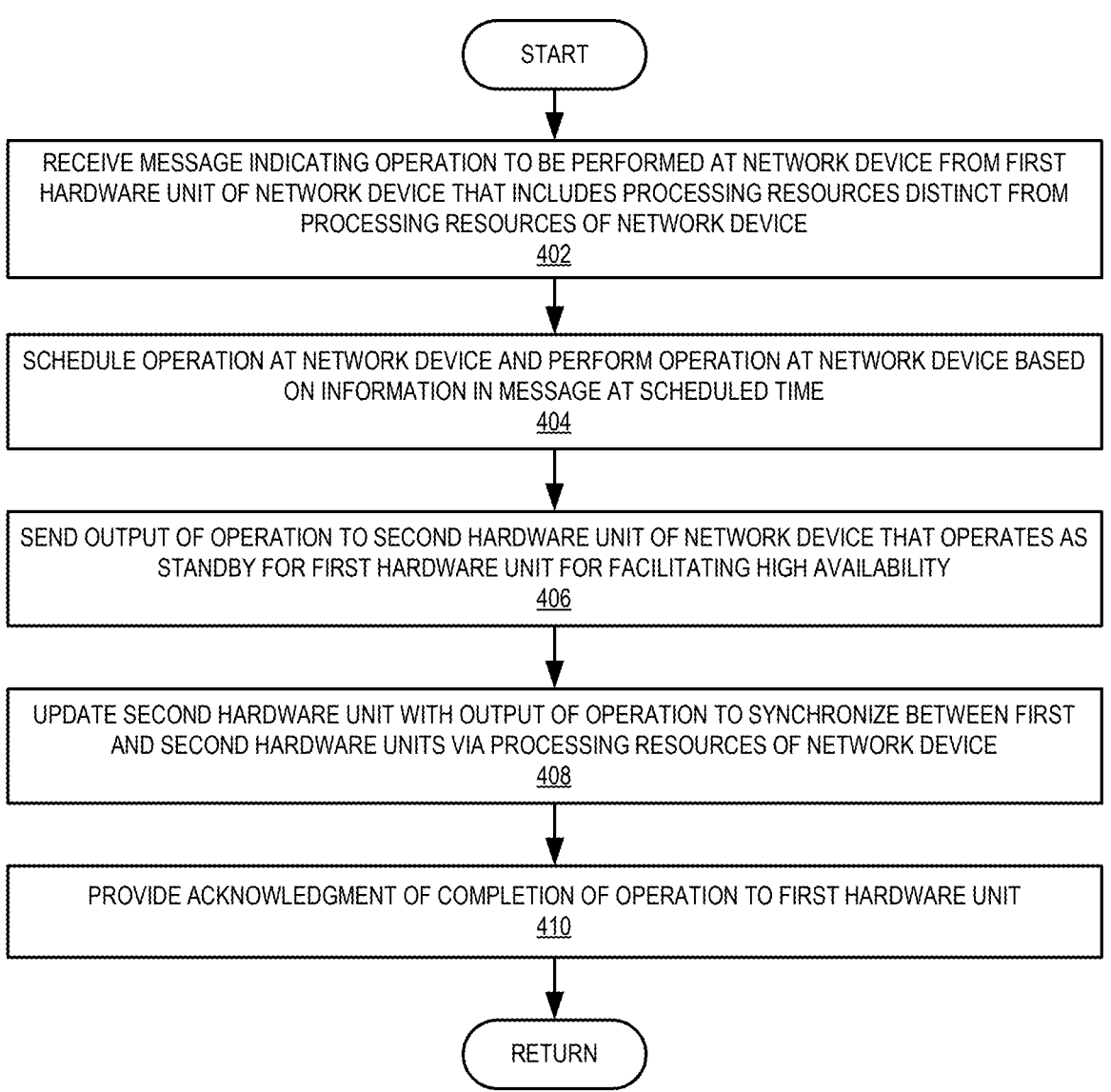

START

RECEIVE MESSAGE INDICATING OPERATION TO BE PERFORMED AT NETWORK DEVICE FROM FIRST HARDWARE UNIT OF NETWORK DEVICE THAT INCLUDES PROCESSING RESOURCES DISTINCT FROM PROCESSING RESOURCES OF NETWORK DEVICE
402

SCHEDULE OPERATION AT NETWORK DEVICE AND PERFORM OPERATION AT NETWORK DEVICE BASED ON INFORMATION IN MESSAGE AT SCHEDULED TIME
404

SEND OUTPUT OF OPERATION TO SECOND HARDWARE UNIT OF NETWORK DEVICE THAT OPERATES AS STANDBY FOR FIRST HARDWARE UNIT FOR FACILITATING HIGH AVAILABILITY
406

UPDATE SECOND HARDWARE UNIT WITH OUTPUT OF OPERATION TO SYNCHRONIZE BETWEEN FIRST AND SECOND HARDWARE UNITS VIA PROCESSING RESOURCES OF NETWORK DEVICE
408

PROVIDE ACKNOWLEDGMENT OF COMPLETION OF OPERATION TO FIRST HARDWARE UNIT
410

RETURN

FIG. 4A

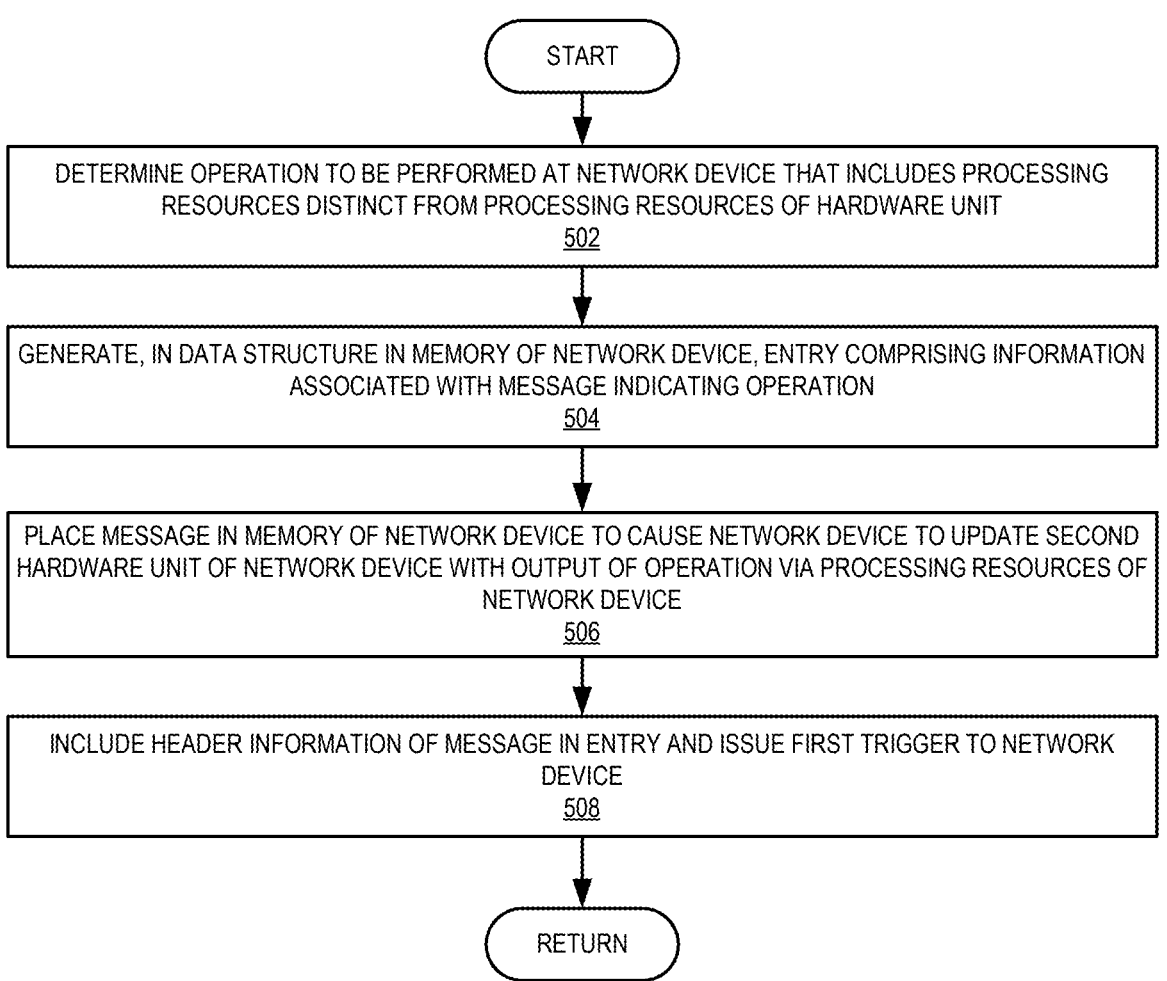

START

DETERMINE OPERATION TO BE PERFORMED AT NETWORK DEVICE THAT INCLUDES PROCESSING RESOURCES DISTINCT FROM PROCESSING RESOURCES OF HARDWARE UNIT
502

GENERATE, IN DATA STRUCTURE IN MEMORY OF NETWORK DEVICE, ENTRY COMPRISING INFORMATION ASSOCIATED WITH MESSAGE INDICATING OPERATION
504

PLACE MESSAGE IN MEMORY OF NETWORK DEVICE TO CAUSE NETWORK DEVICE TO UPDATE SECOND HARDWARE UNIT OF NETWORK DEVICE WITH OUTPUT OF OPERATION VIA PROCESSING RESOURCES OF NETWORK DEVICE
506

INCLUDE HEADER INFORMATION OF MESSAGE IN ENTRY AND ISSUE FIRST TRIGGER TO NETWORK DEVICE
508

RETURN

FIG. 5A

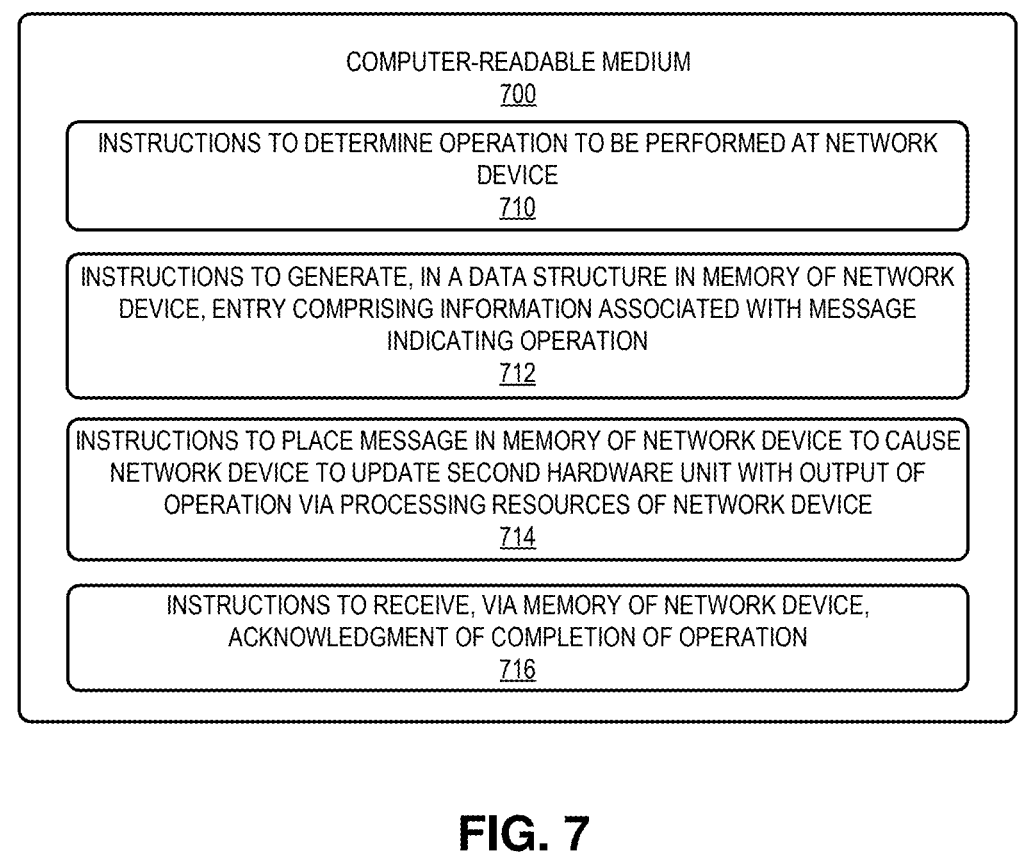

COMPUTER-READABLE MEDIUM
700

INSTRUCTIONS TO DETERMINE OPERATION TO BE PERFORMED AT NETWORK
DEVICE
710

INSTRUCTIONS TO GENERATE, IN A DATA STRUCTURE IN MEMORY OF NETWORK
DEVICE, ENTRY COMPRISING INFORMATION ASSOCIATED WITH MESSAGE
INDICATING OPERATION
712

INSTRUCTIONS TO PLACE MESSAGE IN MEMORY OF NETWORK DEVICE TO CAUSE
NETWORK DEVICE TO UPDATE SECOND HARDWARE UNIT WITH OUTPUT OF
OPERATION VIA PROCESSING RESOURCES OF NETWORK DEVICE
714

INSTRUCTIONS TO RECEIVE, VIA MEMORY OF NETWORK DEVICE,
ACKNOWLEDGMENT OF COMPLETION OF OPERATION
716

FIG. 7

EFFICIENT HIGH AVAILABILITY WITHIN A NETWORK DEVICE

BACKGROUND

A network device, such as a switch, in a network may support different protocols and services. For example, the network device can support one or more protocols to facilitate the distribution of different classes of traffic. The network device can be equipped with hardware modules that can manage and provision its protocols and services.

BRIEF DESCRIPTION OF THE FIGURES

FIG. 4A presents a flowchart illustrating the process of a network device facilitating transparent synchronization between hardware units, in accordance with an aspect of the present application.

FIG. 5A presents a flowchart illustrating the process of a hardware unit instructing a network device to perform an operation, in accordance with an aspect of the present application.

FIG. 7 illustrates an example of a computer-readable medium (CRM) efficiently facilitating high availability among hardware units, in accordance with an aspect of the present application.

In the figures, like reference numerals refer to the same figure elements.

DETAILED DESCRIPTION

Figure 1A:
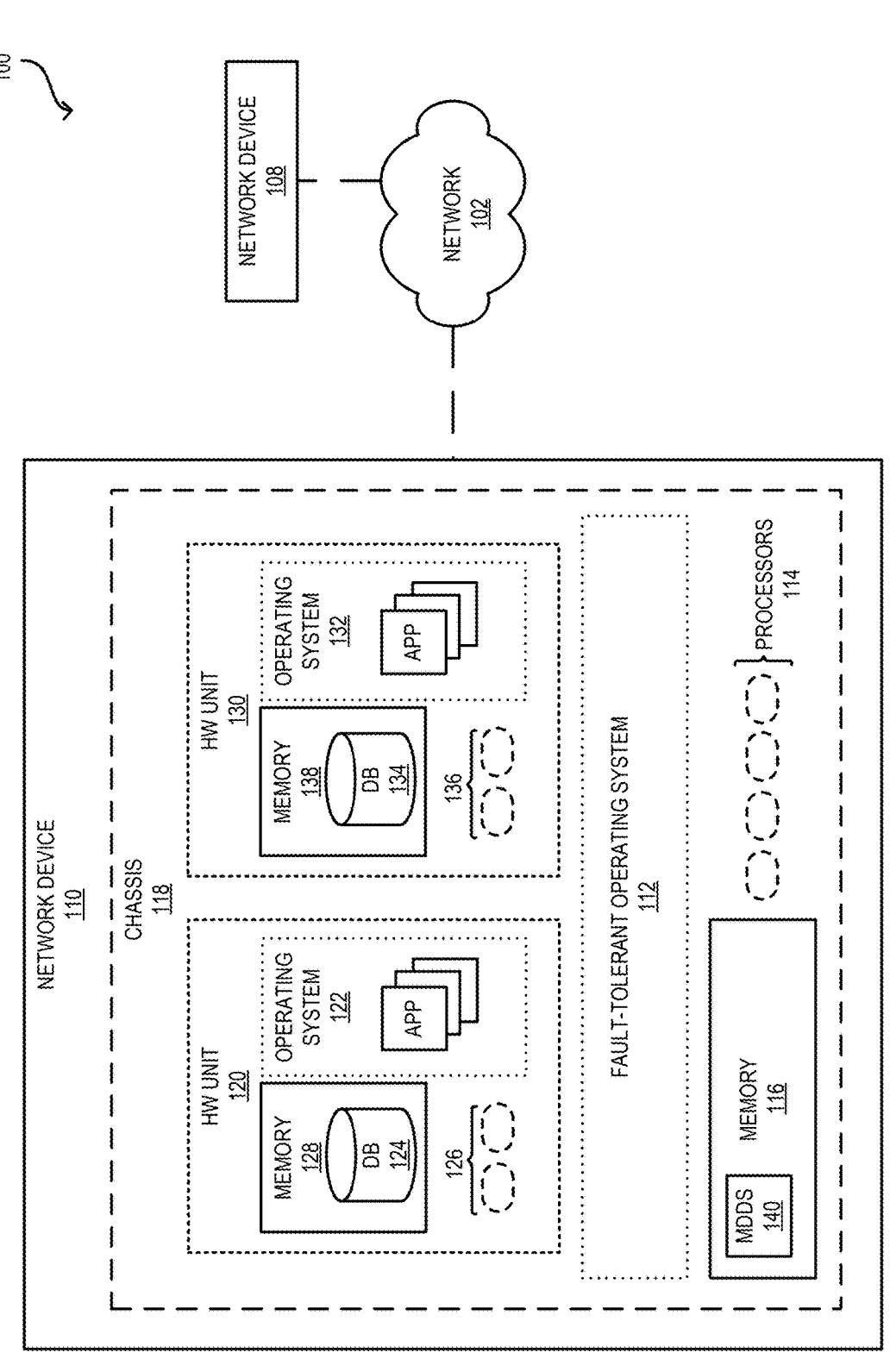
FIG. 1A illustrates an example of a network device efficiently facilitating high availability among hardware units, in accordance with an aspect of the present application.

A network in a computing environment can facilitate data exchange for a variety of applications running on physical and virtual devices. Such applications have brought a progressively increasing amount of network traffic. As a result, network devices, such as switches, are often built with versatile capabilities. To do so, a network device may support different protocols and services. Furthermore, the network device can participate in different types of networks while operating in different roles. The network device can be equipped with a set of hardware units that can support these protocols and services. For example, the network device can include a management module, which can be a hardware unit that facilitates the management and provisioning of protocols and services. These hardware units can be integrated or pluggable into the network device.

Even though the hardware units and the network device can be part of the same device (e.g., the hardware units can be pluggable into the network device), they can be in distinct processing domains. Here, individual hardware units can include their own processing resources. Furthermore, the network device can include processing resources that are separate from the processing resources of a respective hardware unit. To ensure that the network device can continue to facilitate the protocols and services facilitated by a hardware unit, the hardware unit can operate as an active unit in the network device. The network device can then be equipped with a standby hardware unit facilitating high availability to the active unit. Hence, these hardware units can synchronize information so that the standby hardware unit can readily start operating if the active hardware unit becomes unavailable. However, efficiently synchronizing between hardware units in distinct processing domains can be challenging.

The aspects described herein address the problem of efficiently synchronizing between hardware units of a network device by (i) deploying an HSTP on the network device to facilitate efficient message exchanges with the active hardware unit; (ii) performing, by the network device, an operation indicated by a message from the active hardware unit; and (iii) updating the standby hardware unit based on the outputs of the operations. Because the synchronization between the hardware units is performed via the network device, the synchronization process can be referred to as "transparent synchronization." Here, the hardware units may remain unaware of the synchronization or the presence of each other. By offloading the synchronization process to the network device, the hardware units may no longer need hardware and software resources needed for the synchronization. As a result, the hardware units can become cost effective and efficient.

In a computing environment, a network device can be equipped with a hardware unit, such as a pluggable or integrated network card, that can support a service or protocol for the network device. For example, the hardware unit can be a management module that can facilitate a set of network monitoring and management features. In particular, the management module may support protocols, such as Simple Network Management Protocol (SNMP) and Net-Flow protocol, that can be used to manage and provision a network. The management module may monitor network performance and identify potential issues (e.g., congestion at the network device). The hardware unit can also be a security module facilitating one or more security functions, such as secure boot, secure firmware upgrades, intrusion detection, and firewall protection.

Since such a hardware unit can provide a critical feature (e.g., management, security, or both) of the network device, the network device can be equipped with multiple hardware units, which can include at least an active unit and a standby unit, to facilitate high availability. Here, the standby unit can provide failover if the active unit becomes unavailable. The unavailability can be due to failure, removal (e.g., by an administrator), or in-situ updates of the hardware unit. One of these hardware units may actively operate on the network device while the other one may remain as a standby unit. The active hardware unit (or active unit) may need to synchronize states and database content with the standby hardware unit (or standby unit) to ensure a quick failover if needed. Therefore, any state or information changes in the active unit can be synchronized with the standby unit.

However, when two hardware units synchronize with each other, the hardware units may need to include additional hardware and software to support the synchronization process, which may increase the complexity and cost of the hardware units. Moreover, the active unit may execute multiple threads (e.g., belonging to different applications). Under such circumstances, the synchronization process may further include synchronization between threads for a respective state change. However, synchronizing threads can lead to extensive utilization of the processing resources of the hardware units. Due to the strain on the processing resources, the synchronization between the hardware units may adversely affect the performance of the hardware units.

To address this issue, the network device can facilitate transparent synchronization between the hardware units. For example, the network device can run a fault-tolerant operating system (FTOS) that can suppose the synchronization process. Here, the synchronization process is offloaded to the network device from the hardware units. Transparent synchronization can indicate that the hardware units are not aware of the synchronization process. As a result, the active unit may not be aware of the presence of the standby unit. The FTOS can execute on the processing resources of the network device. Therefore, the FTOS can synchronize state changes or database updates between the hardware units via the processing resources of the network device.

The active unit can use a high-speed transport protocol (HSTP) to communicate with the FTOS. The HSTP can allow the active unit to provide a message to the FTOS. During operation, if the active unit is to perform an update that needs to be synchronized, the FTOS ensures that the update is also propagated to the standby unit. Examples of the update can include, but are not limited to, changes to the hardware configuration of the network device or a transaction (e.g., an insert or a delete operation) to a database of the active unit. The database can store operational information of the hardware unit. The active unit can then generate a message comprising information associated with the update and provide the message to the FTOS using the HSTP.

In some examples, to support the message delivery, the network device can maintain a message descriptors data structure (MDDS) in the memory of the network device. A respective entry of the MDDS can include information associated with a message. Accordingly, the active unit can allocate a memory segment in the memory of the network device for the message, generate a message header, and place the message header in an entry of the table using a write operation. The message header can indicate the location of the message (i.e., the message address). The entry can also include additional information associated with the message, such as the length of the message. The active unit can place the message in the allocated memory segment. When the message is placed, the active unit can issue a trigger, such as an interrupt, to the FTOS. Based on the interrupt process supported by the FTOS, the interrupt can include storing a predetermined value in a register of the network device. Based on the trigger, the FTOS can determine that a message is placed in the memory. The FTOS can then obtain the message based on the location indicated in the entry.

Upon receiving the message, the FTOS can perform an operation associated with the update and transparently update the standby unit based on the output of the operation. If the update includes a transaction (e.g., an insertion or deletion operation) on the database of the active unit, the operation can include synchronizing the update with a corresponding database of the standby unit. On the other hand, if the update includes configuration changes, the operation can include changing the hardware configuration of the network device. The change can include changes to the states representing the configuration at the active unit. The FTOS can then transparently update the corresponding states of the standby unit.

Upon completion of the operation, the FTOS can determine whether a response is expected based on the entry in the MDDS. Some operations, such as configuration changes, may require a response from the FTOS. If a response is expected, the active unit can allocate a memory segment in the memory of the network device for the response. The entry in the MDDS can indicate the location of the response. Accordingly, the FTOS can generate the response and place it in the allocated memory segment. In this way, the FTOS can efficiently facilitate synchronization between hardware units in the network device using the HSTP.

For example, if the active unit configures a new virtual local area network (VLAN) on the network device, the active unit can provide a message to the FTOS using HSTP. Based on the message, the FTOS can configure the VLAN on the application-specific integrated circuit (ASIC) of the network device. Subsequently, the FTOS can update the states of the standby unit to indicate that the new VLAN is configured at the network device. The FTOS can provide a response to the active unit with the updated states. Based on the response, the active unit can update its states representing the VLANs configured at the network device. In this way, the states of both units are updated to represent the new set of VLANs. As a result, if the active unit becomes unavailable, the standby unit can continue to operate based on the new set of VLANs.

In this disclosure, the term "network device" is used in a generic sense, and it can refer to any standalone network device or fabric switch operating in any network layer. "Network device" should not be interpreted as limiting examples of the present invention to a particular network layer. Any device that can forward traffic to an external device or another device in the network can be referred to as a "network device." Furthermore, if the network device facilitates communication between networks, the switch can be referred to as a gateway. Therefore, any physical or virtual device (e.g., a virtual machine or switch operating on a computing device) that can operate in a network and forward traffic to an end device can be referred to as a "network device." If the network device is a virtual device, the switch can be referred to as a virtual device. Examples of a "network device" include, but are not limited to, a layer-2 switch, a layer-3 router, a routing switch, a unit of a Gen-Z network, or a fabric switch comprising a plurality of similar or heterogeneous smaller physical and/or virtual switches.

The term "message" refers to a group of bits that can be transported together across a network. "Message" should not be interpreted as limiting examples of the present invention to a particular layer of a network protocol stack. "Message" can be replaced by other terminologies referring to a group of bits, such as "packet," "frame," "cell," "datagram," or "transaction." Furthermore, the term "port" can refer to the port that can receive or transmit data. "Port" can also refer to the hardware, software, and/or firmware logic that can facilitate the operations of that port.

FIG. 1A illustrates an example of a network device efficiently facilitating high availability among hardware units, in accordance with an aspect of the present application. A computing environment 100 can include a number of network devices 108 and 110 coupled to each other via a network 102. Network devices 108 and 110 can be Ethernet, InfiniBand, or other network devices, and may use a corresponding communication protocol, such as Internet Protocol (IP), FibreChannel over Ethernet (FCOE), or other protocol. Network devices 108 and 110 can be associated with respective media access control (MAC) addresses and Internet Protocol (IP) addresses. Network devices 108 and 110 can also operate as tunnel endpoints of respective tunnels. Examples of a tunnel can include, but are not limited to, virtual extensible local area network (VXLAN), Generic Routing Encapsulation (GRE), Network Virtualization using GRE (NVGRE), Generic Networking Virtualization Encapsulation (Geneve), Internet Protocol Security (IPsec), and Multiprotocol Label Switching (MPLS).

Network device 110 can include one or more processors 114 and a memory 116. An FTOS 112 can execute on processors 114. Network device 110 can include a chassis 118 comprising a set of backplane interfaces, such as Peripheral Component Interconnect Express (PCIe) slots, to support pluggable units, each of which can be attachable to a corresponding backplane interface. Chassis 118 can include an interconnect fabric, such as a PCIe fabric, for facilitating interconnection among the units coupling chassis 118. Network device 110 can include hardware units 120 and 130, which can be attached to chassis 118 (e.g., soldered or plugged into backplane interfaces). Hardware unit 120 can include one or more processors 126 and a memory 128. An operating system 122 can execute on processors 126. Hardware unit 120 can also maintain a database 124 in memory 128. One or more applications can run on operating system 122. These applications may perform one or more operations on hardware unit 120. The applications can store the information associated with the operations in database 124.

In some examples, hardware unit 120 can actively manage the resources of network device 110 and may monitor a respective component of network device 110, such as other units, such as line cards and power units, installed on chassis 118. Hardware unit 130 can then be a standby for hardware unit 120. Hardware unit 130 can facilitate high availability if hardware unit 120 becomes unavailable. The unavailability can be due to failure, removal (e.g., by an administrator), or in-situ updates of hardware unit 120. Hardware unit 130 can include one or more processors 136 and a memory 138. An operating system 132 can execute on processors 136. One or more applications can run on operating system 132. Hardware unit 130 can also maintain a database 134 in memory 138. In some examples, databases 124 and 134 can be in-memory key-value store (memkvs) instances, which can operate based on dictionary data structures.

Since hardware unit 120 can provide a critical feature (e.g., management or security) of network device 110, hardware unit 120 may need to synchronize states and database content with hardware unit 130 to ensure a quick failover if needed. However, to synchronize with each other, hardware units 120 and 130 may need to include additional hardware and software to support the synchronization process. As a result, the complexity and cost of hardware units 120 and 130 may increase. Moreover, hardware unit 120 may execute multiple threads associated with the applications running on hardware unit 120. Hardware unit 130 can then execute corresponding threads to ensure high availability. Under such circumstances, the synchronization process may further include synchronization between corresponding threads of hardware units 120 and 130. However, synchronizing threads can lead to extensive utilization of processors 126 and 136 for the synchronization process. Due to the strain on the processing resources, the synchronization process may adversely affect the performance of hardware units 120 and 130.

To address this issue, FTOS 112 can facilitate transparent synchronization between hardware units 120 and 130. Here, the synchronization process is offloaded to FTOS 112 from hardware units 120 and 130. The synchronization can be transparent because hardware units 120 and 130 are not aware of the synchronization process. As a result, hardware unit 120 may not be aware of the presence of hardware unit 130. When hardware unit 120 initiates an update, such as a configuration change of network device 110 or a transaction on database 124, hardware unit 120 can send a message to FTOS 112. Upon receiving the message, FTOS 112 can perform an operation associated with the update and synchronize the output of the operation with hardware unit 130. Since FTOS 112 executes on processors 114, the synchronization operation can be performed via processors 114.

To notify FTOS 112 about the update, hardware unit 120 can send a message to FTOS 112 using HSTP. Network device 110 can maintain an MDDS 140 in memory 116 to manage the message delivery. A respective entry of MDDS 140 can include the header information of a message. To initiate an update, hardware unit 120 can request an entry in MDDS 140. Hardware unit 120 can allocate a memory segment in memory 116 for the message (e.g., using a memory allocation function call). Hardware unit 120 can then generate a message header, which can indicate the location of the message, and insert the message header into the entry of MDDS 140. The entry can include additional information associated with the message, such as the message length. Hardware unit 120 can then store the message in the allocated memory segment and issue a trigger (e.g., an interrupt) to FTOS 112.

Based on the interrupt, FTOS 112 can determine the presence of the message. Accordingly, FTOS 112 can determine the location of the message from the location indicated in the entry in MDDS 140. FTOS 112 can then read the message at the location in memory 116 and perform an operation indicated in the message. If the update includes a transaction on database 124, the operation can include synchronizing the update with database 134. On the other hand, if the update includes configuration changes, the operation can include changing the hardware configuration of network device 110. The change can include changes to the states representing the configuration at hardware unit 120. The FTOS can then transparently update the corresponding states of hardware unit 130.

For example, if hardware unit 120 configures a new VLAN on network device 110, hardware unit 120 can provide a message to FTOS 112 using HSTP via memory 116. Based on the message, FTOS 112 can configure the VLAN on the forwarding hardware (e.g., the ASIC) of network device 110. FTOS 112 can then send the output of the configuration, which may include the identifier of the newly configured VLAN and its associated information, to hardware unit 130. FTOS 112 can update the states of hardware unit 130 to indicate that the new VLAN is configured at network device 110. FTOS 112 can provide a response to hardware unit 120. The response can include information representing the state changes. Based on the response, hardware unit 120 can update its states representing the VLANs configured at network device 110. Hence, the states of hardware units 120 and 130 are updated to represent the new set of VLANs. In this way, FTOS 112 can transparently synchronize between hardware units 120 and 130 based on HSTP.

Figure 1B:
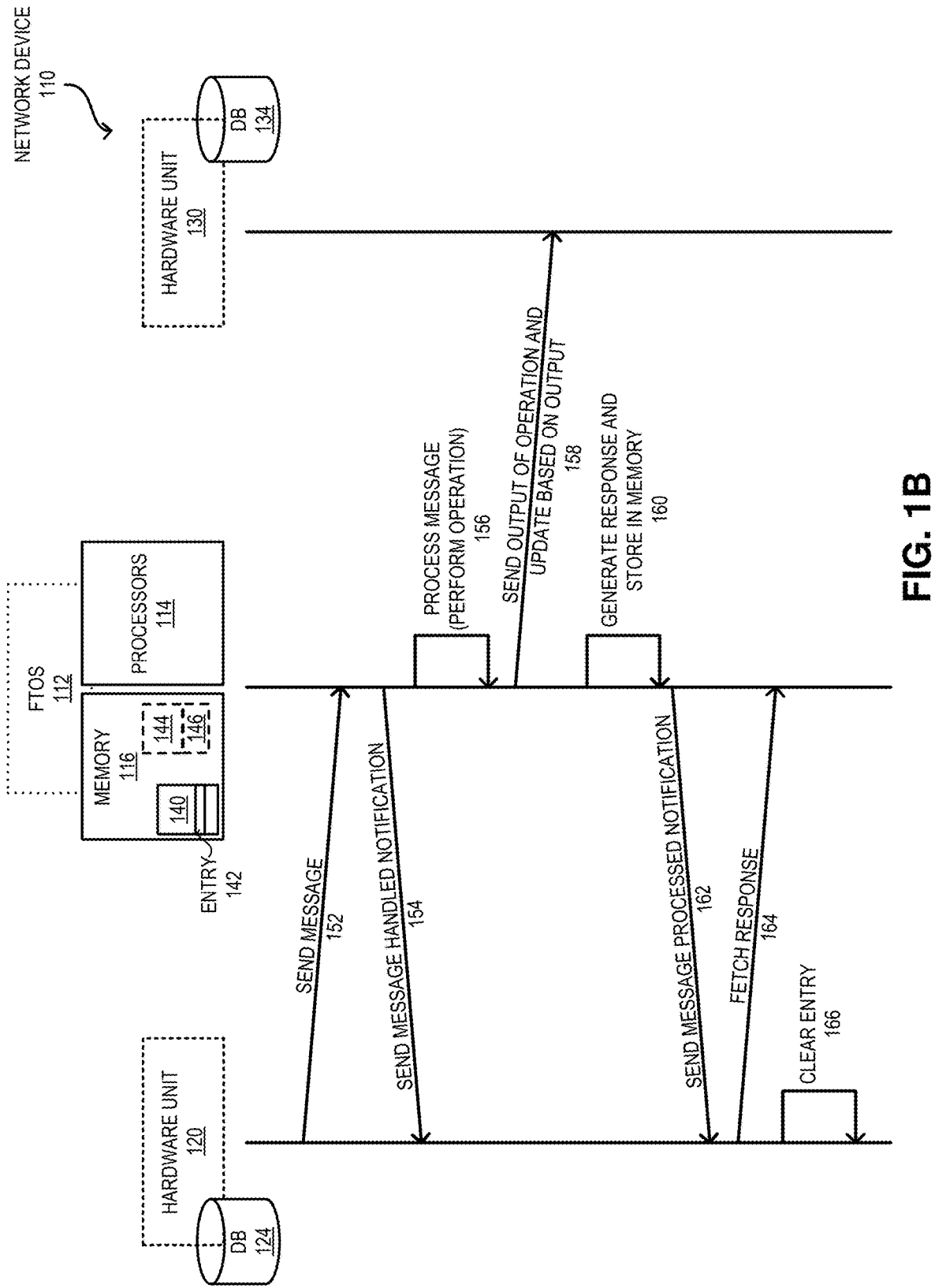
FIG. 1B illustrates an example of transparent synchronization between hardware units of a network device, in accordance with an aspect of the present application.

FIG. 1B illustrates an example of transparent synchronization between hardware units of a network device, in accordance with an aspect of the present application. During operation, hardware unit 120 can send a message to FTOS (operation 152). To send the message, hardware unit 120 can request an entry 142 in MDDS 140 based on a selection policy. Examples of the selection policy can include, but are not limited to, the next-available selection, random selection, and top-down traversal-based selection. Hardware unit 120 can also allocate a memory segment 144 in memory 116 for copying the message. Subsequently, hardware unit 120 can insert the message header and associated information into entry 142 and place the message in memory segment 144. FTOS 112 can determine the location of the message (i.e., the memory address of memory segment 144) and the length of the message from entry 142.

FTOS 112 can then receive the message by reading the message based on the location and the length of the message. Upon receiving the message, FTOS 112 can send a "message handled" notification to hardware unit 120 (operation 154). The notification can indicate that the message is received by FTOS 112, which can then update the hardware of network device 110 or synchronize databases 124 and 134 on behalf of hardware unit 120. In other words, when a hardware unit 120 sends a message (operation 152) and receives the "message handled" notification (operation 154), hardware unit 120 can be aware that the operation in the message is to be performed by FTOS 112. Accordingly, the states or the databases are to be synchronized via FTOS 112 even if hardware unit 120 crashes. To send the notification, FTOS 112 can set a first flag (e.g., a bit in at a predetermined location) in entry 142 and issue an interrupt to hardware unit 120. Based on the interrupt, hardware unit 120 can check the first flag and receive the notification.

FTOS 112 can then process the message by performing an operation indicated in the message (operation 156). The message can include an instruction for configuration changes or database synchronization. Accordingly, FTOS 112 can perform the operation indicated by the instruction. Subsequently, FTOS 112 can send the output of the operation to hardware unit 130 and update hardware unit 130 based on the output (operation 158). For example, if the operation is a configuration change at network device 110, the output of the operation can include information indicating the change. FTOS 112 can then update the states of hardware unit 130 to represent the configuration change based on the information. Similarly, if the operation is synchronization between databases 124 and 134, the output of the operation can include the updated entry of database 124. FTOS 112 can then update database 134 with the updated entry.

Some updates, such as configuration changes, may trigger a response from FTOS 112. When the message is processed, FTOS 112 can generate a response and store it in a preallocated memory segment 146 in memory 116 (operation 160). For example, if the update includes configuration changes, hardware unit 120 can expect a response with information indicating the configuration changes. Accordingly, hardware unit 120 can generate a response and place the response in memory segment 146. FTOS 112 can send a "message processed" notification to hardware unit 120 (operation 162). The notification can indicate that the message is processed by FTOS 112. To send the notification, FTOS 112 can set a second flag in entry 142 and issue an interrupt to hardware unit 120. Based on the interrupt, hardware unit 120 can check the second flag and receive the notification.

If a response is expected, FTOS 112 can set a third flag in entry 142. The third flag can indicate that a response is generated. Upon receiving the interrupt, hardware unit 120 can also check the third flag to determine the presence of the response. The location of the response (i.e., the memory address of memory segment 146) and the size of the response are indicated in entry 142. Accordingly, hardware unit 120 can fetch the response by reading the response from memory segment 146 based on the location and the length of the response (operation 164). When the response is fetched, the update can be completed. Hardware unit 120 can then clear entry 142 in MDDS 140. This entry can be reused for a subsequent update issued from hardware unit 120. In this way, FTOS 112 can facilitate efficient and transparent synchronization between hardware units 120 and 130 using HSTP.

If hardware unit 120 becomes unavailable, hardware unit 130 can continue to operate based on the synchronization. For example, if hardware unit 120 becomes unavailable after sending the message to FTOS 112, as described in conjunction with operation 152, the message is already accessible by FTOS 112. Therefore, FTOS 112 can continue to process the message and update hardware unit 130. As a result, based on the updates, hardware unit 130 can take over the operations that have previously been performed by hardware unit 120. The entries in MDDS 140 for the messages that are not delivered to FTOS 112 can be removed. Furthermore, the allocation of entries of MDDS 140 can start afresh. On the other hand, if FTOS 112 becomes unavailable (e.g., due to a crash), the entries in MDDS 140 for the messages that are delivered to but not processed by FTOS 112 can remain in MDDS 140. The operations associated with these messages can be processed by FTOS 112. In this way, HSTP can facilitate efficient synchronization via FTOS 112.

Figure 2:
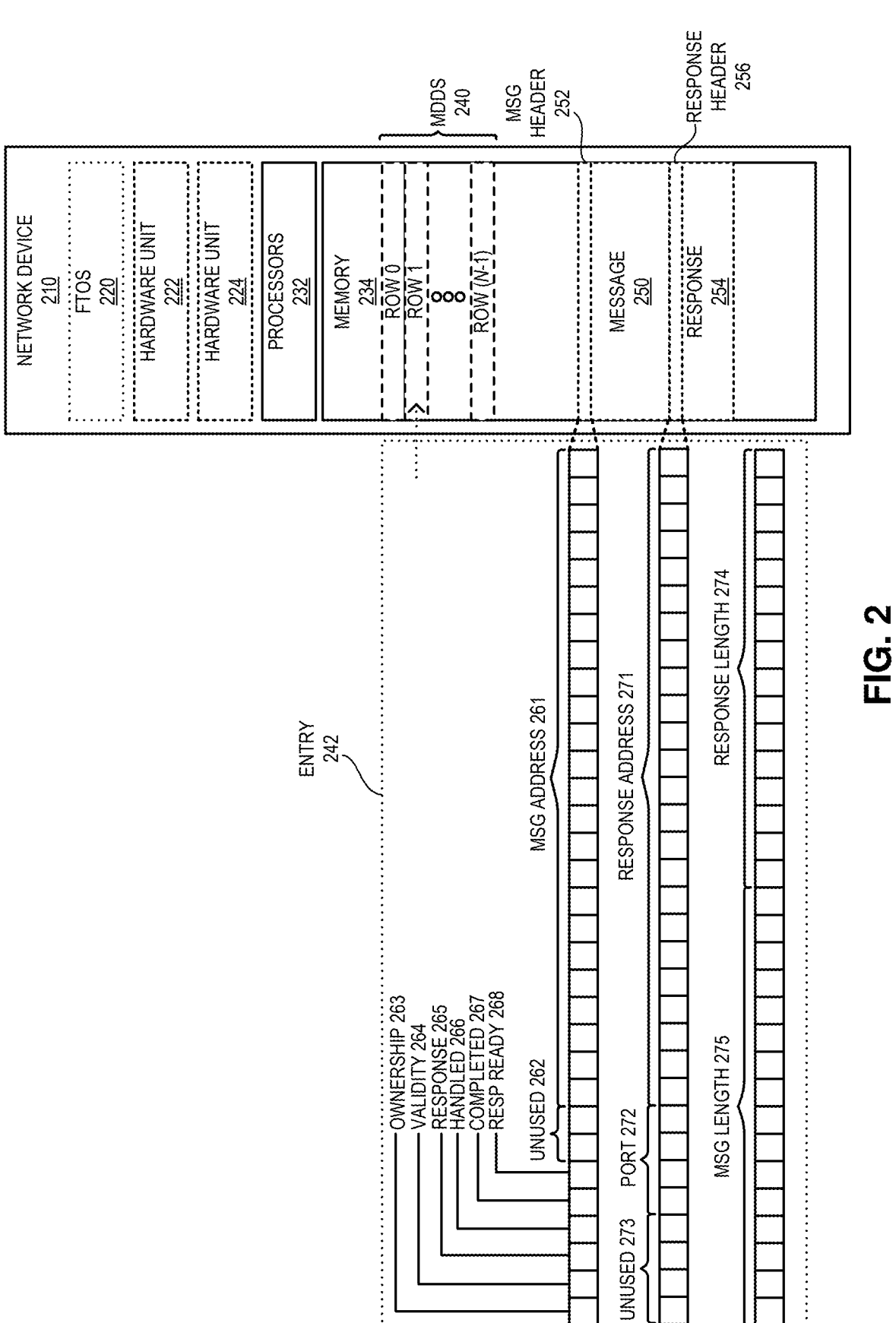
FIG. 2 illustrates an example of an efficient high-speed transport protocol (HSTP) for transparently synchronizing between hardware units of a network device, in accordance with an aspect of the present application.

FIG. 2 illustrates an example of an efficient HSTP for transparently synchronizing between hardware units of a network device, in accordance with an aspect of the present application. A network device 210 can include one or more processors 232 and a memory 234. An FTOS 220 can execute on processors 232. Network device 210 can include hardware units 222 and 224, which can be attached to network device 210 (e.g., soldered or plugged into the backplane). Each of hardware units 222 and 224 can include one or more processors and a memory, and can execute an operating system. Each of hardware units 222 and 224 can also maintain a database in its memory. In some examples, these databases can be in-memory key-value store (memkvs) instances, which can operate based on dictionary data structures.

In this example, hardware unit 222 can actively manage the resources of network device 210 and may monitor a respective component of network device 210, such as other units installed on network device 210. Hardware unit 224 can then be a standby for hardware unit 222. Hardware unit 224 can facilitate high availability if hardware unit 222 becomes unavailable. The unavailability can be due to failure, removal (e.g., by an administrator), or in-situ updates of hardware unit 222. Since hardware unit 222 can provide a critical feature (e.g., management or security) of network device 210, hardware unit 222 can synchronize states and database content with hardware unit 224 via FTOS 220 (e.g., via processors 232) using HSTP.

To notify FTOS 220 about an update, hardware unit 222 can send a message to FTOS 220 using HSTP. Network device 210 can maintain an MDDS 240 in memory 234 to manage the message delivery. A respective entry of MDDS 240 can include the header information of a message. During operation, hardware unit 222 can initiate an update. Hardware unit 222 can allocate a memory segment in memory 234 for a message 250 comprising an instruction associated with the update. Hardware unit 222 can request an entry in MDDS 240 based on a selection policy. If the selection policy selects entry 242, hardware unit 222 can continue with the delivery of message 250. However, if an entry is unavailable in MDDS 240, hardware unit 222 may abort the update and try again after waiting for a predetermined period.

Hardware unit 222 can generate a message header 252 of message 250. Message header 252 can include a number of fields. Hardware unit 222 can insert message header 252 into entry 242 of MDDS 240. Hardware unit 222 can then store message 250 in the allocated memory segment and issue a trigger (e.g., an interrupt) to FTOS 220. Message header 252 can include a message address 261, which indicates the location of message 250 in memory 234. Entry 242 can include additional information associated with message 250, such as message length 275 of message 250 (e.g., in number of bytes). In addition, message header 252 can include a number of fields, such as ownership flag 263, validity flag 264, response flag 265, handled flag 266, completed flag 267, and response ready flag 268. Message header 252 may include unused bits 262, which can be available for future use (e.g., for a customized operation).

Ownership flag 263 can indicate which entity of network device 210 currently has ownership of entry 242 (i.e., can edit entry 242). For example, a value of "O" may indicate that the ownership belongs to hardware unit 222, while a value of "1" may indicate that the ownership belongs to FTOS 220. It should be noted that the reversed values of ownership flag 263 can also be used to indicate the ownership. Furthermore, a set value (i.e., a value of "1") of validity flag 264 can indicate that entry 242 includes valid data and ready to be processed by FTOS 220. On the other hand, a clear value (i.e., a value of "0") of validity flag 264 can indicate that entry 242 is not yet ready for processing by FTOS 220.

A set value of response flag 265 can indicate that hardware unit 222 expects a response of message 250 from FTOS 220. If hardware unit 222 sets response flag 265, hardware unit 222 can also allocate a memory segment for response 254 from FTOS 220 and include response header 256 in entry 242. Response header 256 can include a response address 271, which indicates the location of message 254 in memory 234. Response header 256 can also include a port number 272, which can identify a protocol port via which one or more applications running on hardware unit 222 can access memory 234. Hence, port number 272 can identify the protocol port via which the applications may use the same memory 234 to synchronize with hardware unit 224 via FTOS 220. If a response is expected, entry 242 can include additional information associated with response 254, such as response length 274 of response 254.

A set value of handled flag 266 can indicate that FTOS 220 has "handled" message 250, which can include scheduling message 250 for processing. Hence, handled flag 266 can be set by FTOS 220 upon scheduling message 250 for processing. Similarly, a set value of completed flag 267 can indicate that FTOS 220 has processed message 250, which can include performing an operation indicated in message 250. If response flag 265 is set, a set value of response ready flag 268 can indicate that response 254 is ready for hardware unit 222. Here, response ready flag 268 can be set by FTOS 220 upon copying response 254 into the memory segment allocated for response 254.

Figure 3:
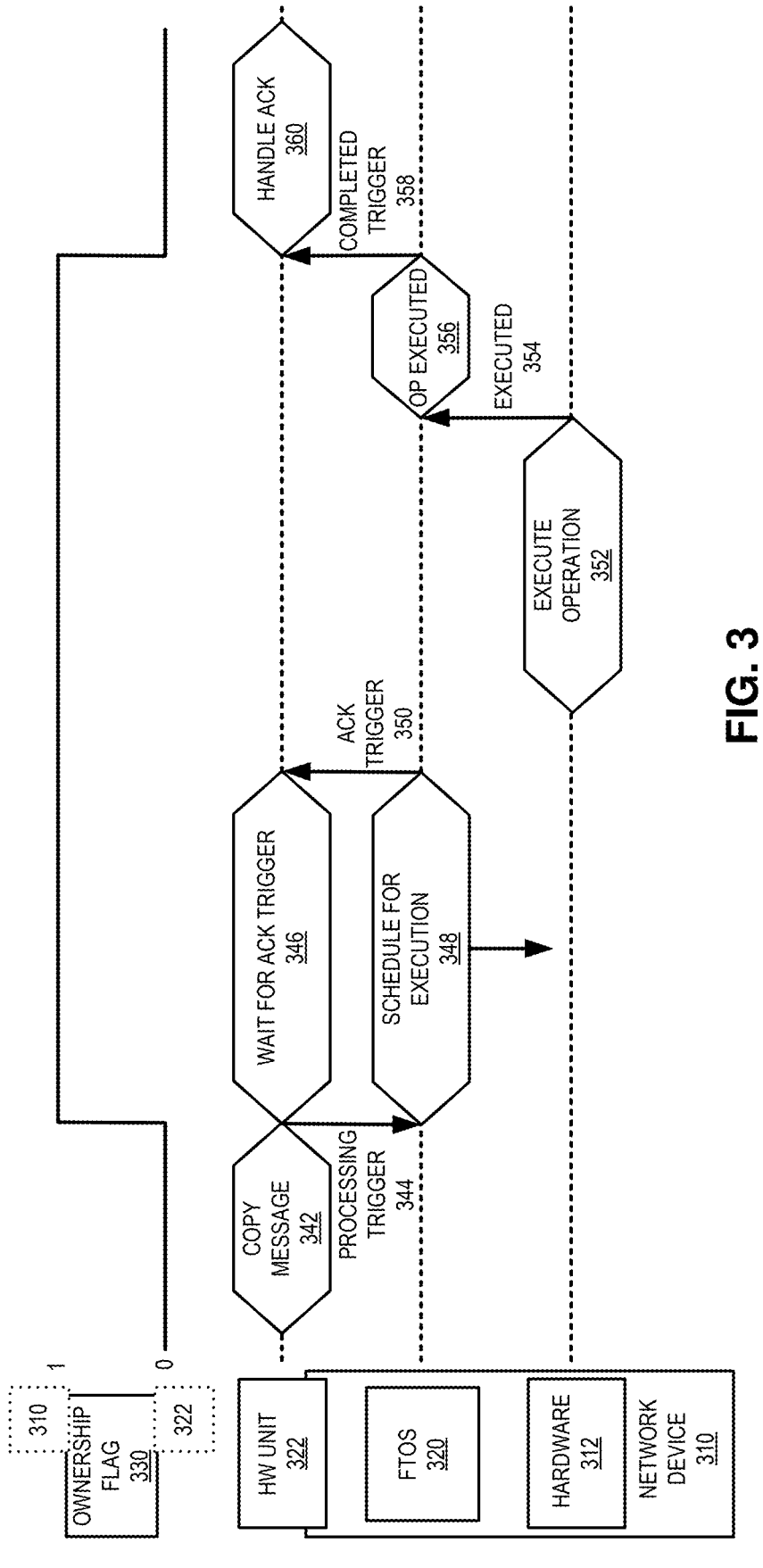
FIG. 3 illustrates examples of ownership associated with an entry of a data structure supporting an HSTP for transparently synchronizing between hardware units of a network device, in accordance with an aspect of the present application.

FIG. 3 illustrates examples of ownership associated with an entry of a data structure supporting an HSTP for transparently synchronizing between hardware units of a network device, in accordance with an aspect of the present application. A network device 310 can include forwarding hardware 312 (e.g., forwarding ASIC) and execute an FTOS 320. Network device 310 can include hardware unit 322, which can be attached to network device 210 (e.g., soldered or plugged into the backplane). Hardware unit 322 can include one or more processors and a memory, and can execute an operating system. Hardware unit 322 can also maintain a database in its memory. In some examples, these databases can be in-memory key-value store (memkvs) instances, which can operate based on dictionary data structures. In this example, hardware unit 322 can actively manage the resources of network device 310 and may monitor a respective component of network device 310.

During operation, to deliver a message associated with an update, hardware unit 322 can manage the allocation of memory. Hardware unit 322 can also request an entry in MDDS. The entry can include an ownership flag 330, as described in conjunction with FIG. 2. Hardware unit 322 can copy the message in the allocated memory (operation 342). Hardware unit 322 can then send a processing trigger to network device 310 (e.g., to FTOS 320) (operation 344). The trigger can be based on an interrupt issued from hardware unit 322 to network device 310. Since the copying operation is executed by hardware unit 322, ownership flag 330 can indicate that the ownership is associated with hardware unit 322. When the trigger is sent, the subsequent operations are executed by network device 310. Hardware unit 322 can then change ownership flag 330 to indicate that the ownership is associated with network device 310 and wait for an acknowledgment trigger from network device 310 (operation 346).

When network device 310 receives the processing trigger, network device 310 can schedule the operation associated with the message for execution (operation 348). Since hardware 312 may execute a large number of operations of network device 310, hardware 312 may not be readily available for executing the operation in the message. Therefore, network device 310 can schedule when the operation is to be executed on hardware 312 based on its availability. Upon scheduling the operation, network device 310 can set the handled flag in the entry and send the acknowledgment trigger to hardware unit 322 (operation 350). Sending the trigger can include sending an interrupt to hardware unit 322. At this point, hardware unit 322 can determine that the message is delivered and scheduled for execution at network device 310.

Hardware 312 can then execute the operation at the scheduled time (operation 352). For example, hardware 312 can perform a configuration change indicated by the message at the scheduled time. Network device 310, at FTOS 320, can detect that the operation is executed (operation 354). Accordingly, network device 310 can perform subsequent operations associated with the execution of the message (operation 356). Such operations can include updating a standby hardware unit of network device 310. Network device 310 can then set the completed flag in the entry and send a completed trigger to hardware unit 322 (operation 358). Sending the trigger can include sending an interrupt to hardware unit 322.

When network device 310 has completed the execution of the operation, the subsequent operations are executed by hardware unit 322. Network device 310 can then change ownership flag 330 to indicate that the ownership is associated with hardware unit 322. Subsequently, hardware unit 322 can handle the acknowledgment (operation 360). To do so, hardware unit 322 may obtain a response from the memory of network device 310 if a response is expected. Handling the acknowledgment can also include clearing the entry from the MDDS, thereby freeing the entry for a subsequent update from hardware unit 322.

FIG. 4A presents a flowchart illustrating the process of a network device facilitating transparent synchronization between hardware units, in accordance with an aspect of the present application. During operation, the network device can receive a message indicating an operation to be performed at the network device from a first hardware unit of the network device (operation 402). Here, the first hardware unit can include processing resources distinct from the processing resources of the network device. The operation can be a configuration change to the forwarding hardware of the network device or database synchronization associated with a transaction performed on a database of the first hardware unit.

Upon receiving the message, the network device can schedule the operation at the network device and perform the operation at the network device based on the information in the message at the scheduled timer (operation 404). The network device can execute the operation at the hardware of the network device. However, since the hardware may execute a large number of operations of the network device, the hardware may not be readily available for executing the operation in the message. Therefore, the network device can schedule when the operation is to be executed on the hardware based on its availability. When the operation is executed, the network device can send the output of the operation to a second hardware unit of the network device that operates as a standby for the first hardware unit for facilitating high availability (operation 406). If the first hardware unit becomes unavailable, the second hardware unit can take over the operations of the first hardware unit.

To ensure that the second hardware unit can efficiently facilitate high availability, the network device can update the second hardware unit with the output of the operation to synchronize between the first and second hardware units via one or more processing resources of the network device (operation 408). For example, if the operation includes configuration changes at the network device, the network device can send the information representing the configuration changes to the second hardware unit. The network device can then update the states of the second hardware unit to represent the configuration changes. The network device can then provide an acknowledgment of the completion of the operation to the first hardware unit (operation 410). Based on the acknowledgment, the first hardware unit can determine that the operation indicated in the message is executed at the network device.

Figure 4B:
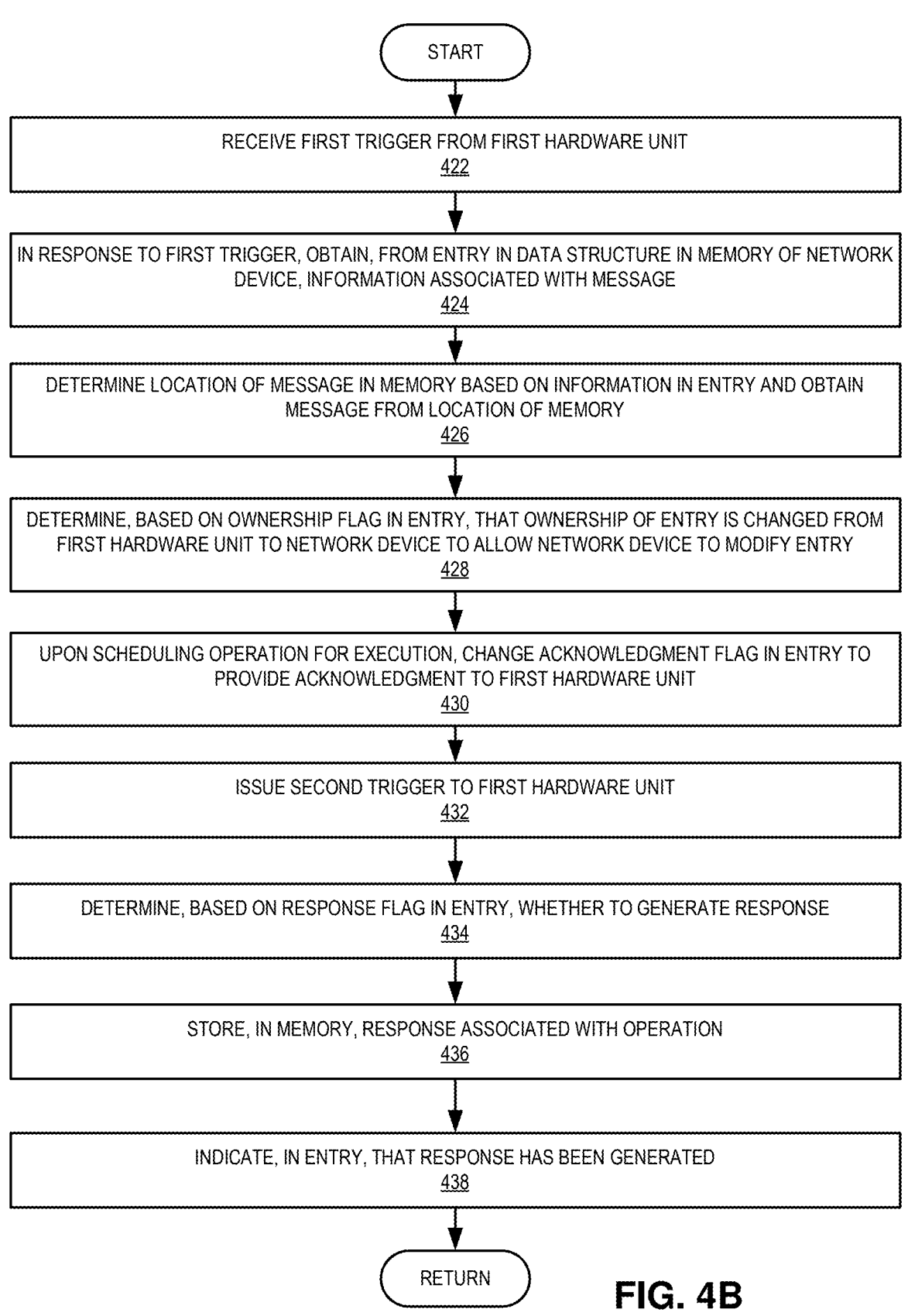
FIG. 4B presents a flowchart illustrating the process of a network device communicating with a hardware unit based on the HSTP, in accordance with an aspect of the present application.

FIG. 4B presents a flowchart illustrating the process of a network device communicating with a hardware unit based on the HSTP, in accordance with an aspect of the present application. During operation, the network device can receive a trigger from the first hardware unit (operation 422). The first trigger can be an interrupt issued to the processing resources of the network device. For example, the first hardware unit can store a predetermined value in an interrupt register to issue the interrupt. In response to the first trigger, the network device can obtain, from an entry in a data structure (e.g., an MDDS) in the memory of the network device, information associated with the message (operation 424). The first hardware unit can request the entry from the data structure and place the information in the entry. The information can include the location of the message (e.g., the memory address of the message) and the message length (e.g., in number of bytes).

Accordingly, the network device can determine the location of the message in the memory based on the information in the entry and obtain the message from the location in the memory (operation 426). Since the network device can obtain the memory address and length of the message from the entry, the network device can obtain the message by reading the number of bytes indicated by the length from the memory address. The network device can then determine, based on an ownership flag in the entry, that the ownership of the entry is changed from the first hardware unit to the network device to allow the network device to modify the entry (operation 428). A set value of the ownership flag can indicate that the ownership is associated with the network device. When the first hardware unit copies the message in the memory of the network device, the first hardware unit can change the ownership flag to transfer the ownership of the entry to the network device.

The network device can schedule the operation to be executed. Upon scheduling the operation for execution, the network device can change an acknowledgment flag in the entry to provide an acknowledgment to the first hardware unit (operation 430). Since the ownership is transferred to the network device, the network device can change the acknowledgment flag in the entry. The network device can also issue a second trigger to the first hardware unit (operation 432). Based on the second trigger, the first hardware unit can check the acknowledgment flag and determine that the operation is scheduled for execution.

Execution of some operations may generate a response. Accordingly, the first hardware unit can indicate, in a response flag in the entry, that a response is expected. When the execution of the operation is completed, the network device can determine, based on the response flag in the entry, whether to generate a response (operation 434). If a response is expected, the first hardware unit can allocate a memory segment in the memory of the network device for the response. The network device can then store, in the memory, the response associated with the operation (operation 436). The network device can indicate, in the entry, that the response has been generated (operation 438). For example, the network device can set a response ready flag the entry to indicate that the response is ready for the first hardware unit.

Figure 4C:
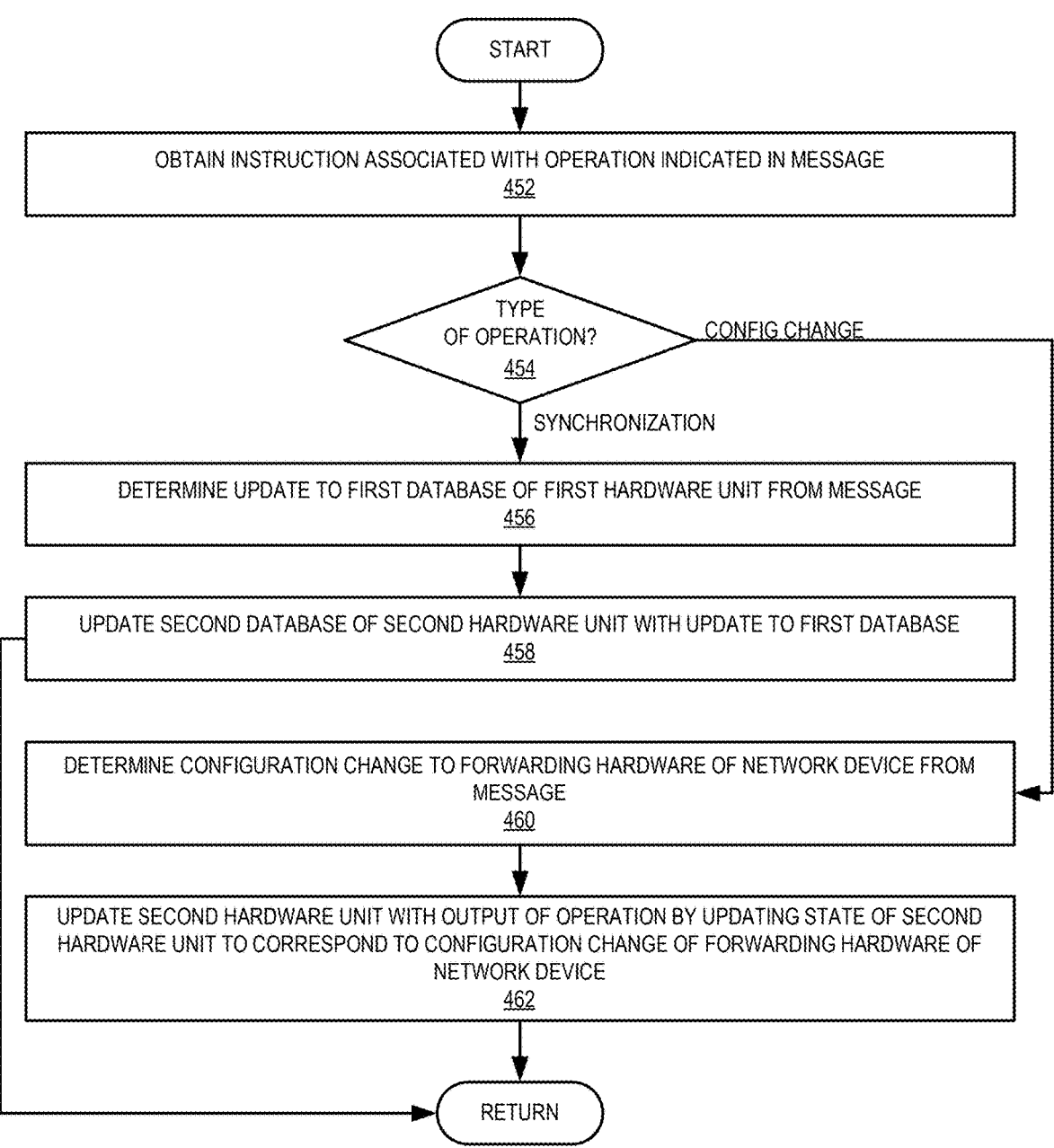
FIG. 4C presents a flowchart illustrating the process of a network device updating a standby hardware unit to synchronize with a primary hardware unit, in accordance with an aspect of the present application.

FIG. 4C presents a flowchart illustrating the process of a network device updating a standby hardware unit to synchronize with a primary hardware unit, in accordance with an aspect of the present application. During operation, the network device can obtain an instruction associated with the operation indicated in the message (operation 452). The instruction can indicate what type of operation is to be executed on the network device. Accordingly, the network device can determine the type of operation (operation 454). If the type of operation indicates synchronization between database instances, the network device can determine an update to a first database of the first hardware unit from the message (operation 456). For example, the message can indicate a transaction performed on the first database and include the parameters of the transaction. Based on the transaction and the parameters, the network device can determine the update to the first database. Alternatively, the message may include one or more updated entries that need to be synchronized.

The network device can then update a second database of the second hardware unit with the update to the first database (operation 458). Since the operation is the synchronization between the first and second databases, the output of the operation can be the update to the first database. On the other hand, if the type of operation includes a configuration change, the network device can determine the configuration change to the forwarding hardware of the network device from the message (operation 460). The instruction in the message can indicate the configuration change. The configuration change can be represented by a state change in the first hardware unit. To synchronize the state change, the network device can update the second hardware unit with the output of the operation by updating the state of the second hardware unit to correspond to the configuration change of the forwarding hardware of the network device (operation 462).

FIG. 5A presents a flowchart illustrating the process of a hardware unit instructing a network device to perform an operation, in accordance with an aspect of the present application. During operation, the hardware unit can determine an operation to be performed at a network device that includes processing resources distinct from the processing resources of the hardware unit (operation 502). The operation can be a configuration change to the forwarding hardware of the network device or database synchronization associated with a transaction performed on a database of the hardware unit. The hardware unit can then generate, in a data structure (e.g., an MDDSS) in the memory of the network device, an entry comprising information associated with a message indicating the operation (operation 504). The hardware unit can request the entry from the data structure based on a selection policy and place the information in the entry.

The hardware unit can allocate a memory segment in the memory of the network device. The hardware unit can then place the message in the memory of the network device (i.e., in the allocated memory segment) (operation 506). The message can cause the network device to update a second hardware unit of the network device with the output of the operation via the processing resources of the network device. If the hardware unit becomes unavailable, the second hardware unit can take over the operations of the hardware unit. To ensure that the second hardware unit can efficiently facilitate high availability, the network device can update the second hardware unit with the output of the operation. The hardware unit can include the header information of the message in the entry and issue a first trigger to the network device (operation 508). The header information can include the location of the message (e.g., the memory address of the message) and a set of flags that can facilitate communication between the hardware unit and the network device.

Figure 5B:
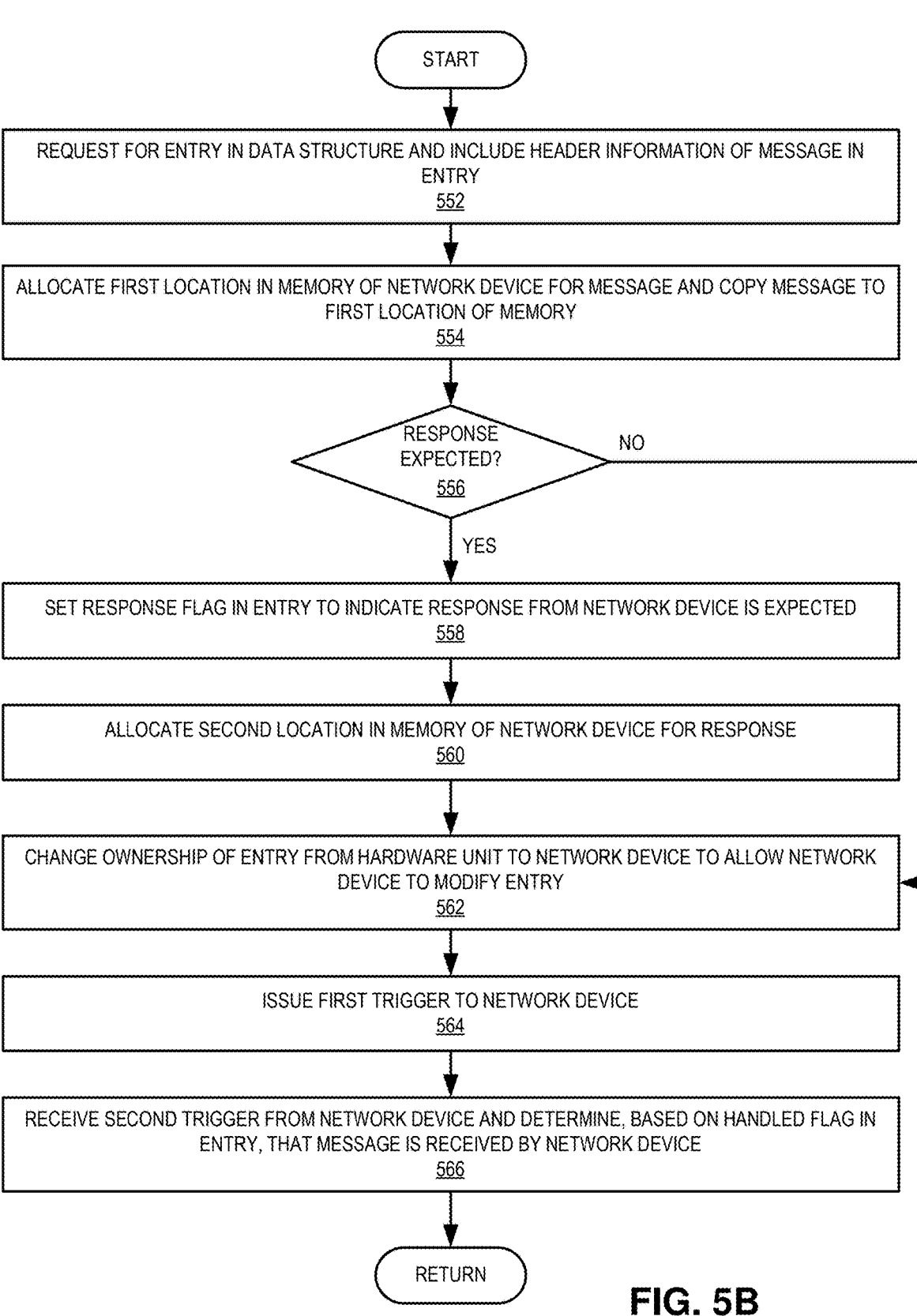
FIG. 5B presents a flowchart illustrating the process of a hardware unit communicating with a network device based on the HSTP, in accordance with an aspect of the present application.

FIG. 5B presents a flowchart illustrating the process of a hardware unit communicating with a network device based on the HSTP, in accordance with an aspect of the present application. During operation, the hardware unit can request for an entry in the data structure and include the header information of the message in the entry (operation 552). If the request is successful, an entry is allocated for the message. The hardware unit can then allocate a first location in the memory of the network device for the message and copy the message to the first location of the memory (operation 554). Here, the hardware unit may use a memory allocation function call to allocate a first memory segment corresponding to the first location and place the message in the first memory segment.

Execution of some operations may generate a response from the network device. Based on the operation, the hardware unit can determine whether a response is expected (operation 556). If a response is expected, the hardware unit can set a response flag in the entry to indicate that a response is expected from the network device (operation 558). The response flag notifies the network device regarding the expectation of the response. To allow the network device to provide the response, the hardware unit can allocate a second location in the memory of the network device for the response (operation 558). The hardware unit may allocate a second memory segment corresponding to the second location where the network device may place the response.

If a response is not expected (operation 556) or upon allocating the second location, the hardware unit can change the ownership of the entry from the hardware unit to the network device to allow the network device to modify the entry (operation 562). The ownership of the entry can be represented by an ownership flag in the entry. A set value of the ownership flag can indicate that the ownership is associated with the network device. The network device can then issue a first trigger to the network device (operation 564). The first trigger can be an interrupt issued to the processing resources of the network device (e.g., based on a predetermined value in an interrupt register). The hardware unit can receive a second trigger from the network device and determine, based on a handled flag (e.g., handled flag 266 in FIG. 2) in the entry, that the message is received by the network device (operation 566).

Figure 6:
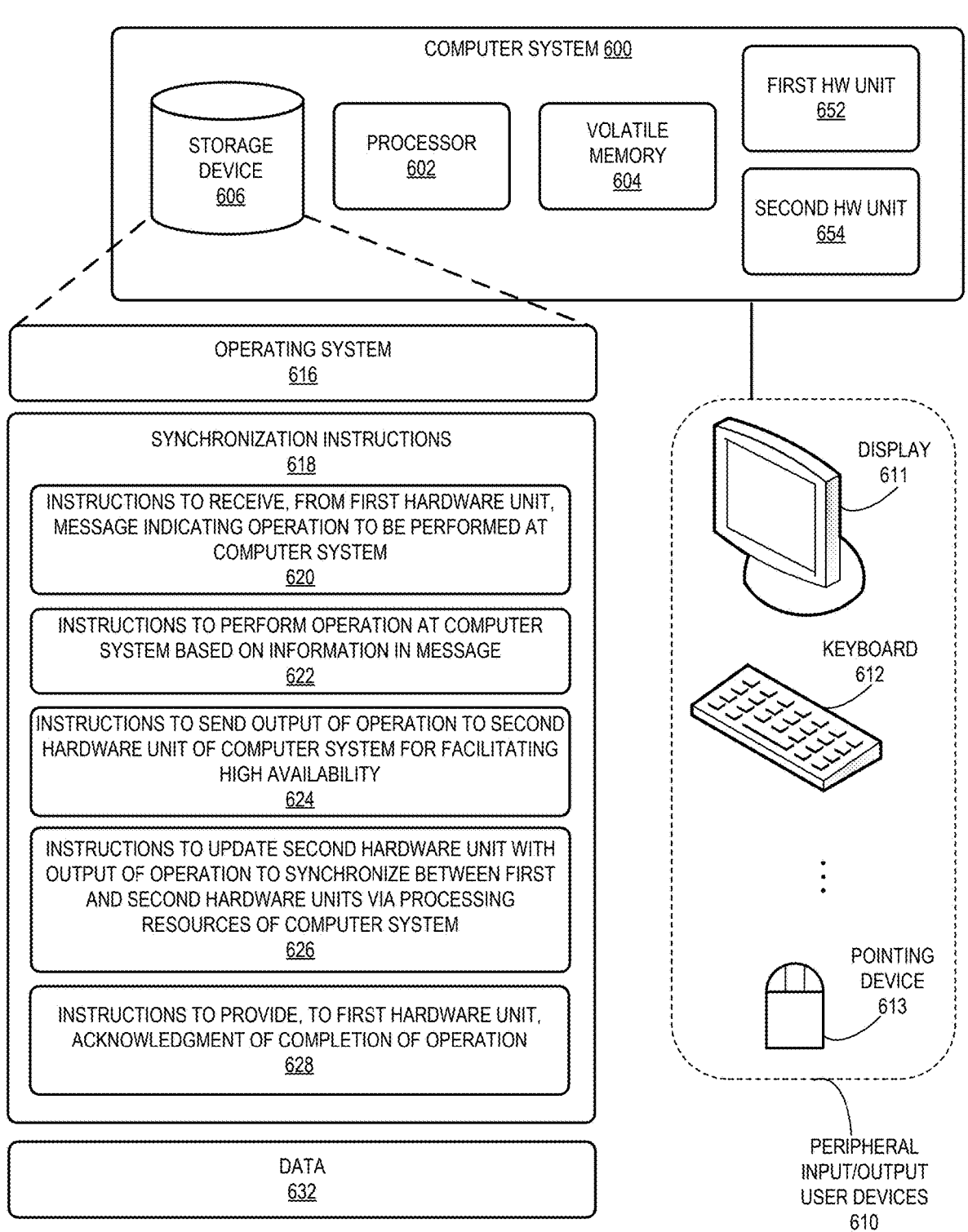
FIG. 6 illustrates an example of a computing system efficiently facilitating high availability among hardware units, in accordance with an aspect of the present application.

FIG. 6 illustrates an example of a computing system efficiently facilitating high availability among hardware units, in accordance with an aspect of the present application. Computer system 600 includes a processor 602, a memory 604, and a storage device 606. Memory 604 can include a volatile memory (e.g., random access memory (RAM)) that serves as a managed memory and can be used to store one or more memory pools. Furthermore, computer system 600 can be coupled to peripheral I/O user devices 610 (e.g., a display device 611, a keyboard 612, and a pointing device 613). Storage device 606 includes a non-transitory computer-readable storage medium and stores an operating system 616, synchronization instructions 618, and data 632. Computer system 600 may include fewer or more entities or instructions than those shown in FIG. 6. Computer system 600 can include a first hardware unit 652 and a second hardware unit 654. In this example, second hardware unit 654 can operate as a standby to first hardware unit 652.

Synchronization instructions 618 can include instructions, which when executed by computer system 600, can cause computer system 600 to perform methods and/or processes described in this disclosure. Specifically, synchronization instructions 618 may include instructions 620 to receive, from a first hardware unit 652, a message indicating an operation to be performed at computer system 600. The operation can be a configuration change to the forwarding hardware of computer system 600 or database synchronization associated with a transaction performed on a database of first hardware unit 652. Synchronization instructions 618 can also include instructions 622 to perform the operation at computer system 600 based on the information in the message. Examples of message exchange and execution of operations are further described in conjunction with FIGS. 1A and 1B.

Computer system 600 can then perform the operation and generate an output. Synchronization instructions 618 may also include instructions 624 to send the output of the operation to second hardware unit 654 of computer system 600 for facilitating high availability. Furthermore, synchronization instructions 618 may include instructions 626 to update second hardware unit 654 with the output of the operation to synchronize between first and second hardware units 652 and 654, respectively, via the processing resources (e.g., processors 602) of computer system 600. Sending the output of the operation and updating the second hardware unit are further described in conjunction with FIGS. 1A and 1B. When second hardware unit 654 is updated, the operations at computer system 600 can be complete. Synchronization instructions 618 can then include instructions 628 to provide, to first hardware unit 652, an acknowledgment of the completion of the operation, as described in conjunction with FIGS. 2 and 3.

Data 632 can include any data that is required as input, or that is generated as output by the methods, operations, communications, and/or processes described in this disclosure. Specifically, data 632 can include a message, a response, and the information in an entry in an MDDS (e.g., a message header, a response header, and additional information). Data 628 can also store parameter values provided in the instruction in a message, an output of an operation, database entries, and updated states representing configuration changes at computer system 600.

Computer system 600 and synchronization instructions 618 may include more instructions than those shown in FIG. 6. For example, synchronization instructions 618 can also store instructions for executing the operations described above in relation to: the generation of respective entries in databases 124 and 134 of FIG. 1A; clearing of an entry of an MDDS of FIG. 1B; an application obtaining information from a protocol port of FIG. 2; setting and clearing a respective flag of an application obtaining information from a protocol port of FIG. 2; sending and receiving triggers of FIG. 3; managing ownership of an entry of FIG. 3; and the operations depicted in the flowcharts of FIGS. 4A-4C and 5A-5B; and the instructions of non-transitory CRM 700 in FIG. 7.

FIG. 7 illustrates an example of a computer-readable medium (CRM) efficiently facilitating high availability among hardware units, in accordance with an aspect of the present application. CRM 700 can be a non-transitory computer-readable medium or device storing instructions that when executed by a computer or processor cause the computer or processor to perform a method. CRM 700 can be integrated with a hardware unit of a network device. CRM 700 can store instructions 710 to determine an operation to be performed at a network device, as described above in relation to operation 152 of FIG. 1B.

CRM 700 can also include instructions 712 to generate, in a data structure (e.g., an MDDSS) in the memory of the network device, an entry comprising information associated with a message indicating the operation, as described above in relation to entry 142 of FIG. 1B. CRM 700 can include instructions 714 to place the message in the memory of the network device (i.e., in an allocated memory segment) to update the second hardware unit with the output of the operation via the processing resources of the network device, as described above in relation to operation 158 of FIG. 1B. CRM 700 can additionally include instructions 716 to receive, via the memory of the network device, an acknowledgment of the completion of the operation, as described above in relation to operation 162 of FIG. 1B and handled flag 266 of FIG. 2.

CRM 700 may include more instructions than those shown in FIG. 7. For example, CRM 700 can also store instructions for executing the operations described above in relation to: the generation of respective entries in databases 124 and 134 of FIG. 1A; clearing of an entry of an MDDS of FIG. 1B; an application obtaining information from a protocol port of FIG. 2; setting and clearing a respective flag of an application obtaining information from a protocol port of FIG. 2; sending and receiving triggers of FIG. 3; managing ownership of an entry of FIG. 3; and the operations depicted in the flowcharts of FIGS. 4A-4C and 5A-5B; and the instructions of computer system 600 in FIG. 6.

The description herein is presented to enable any person skilled in the art to make and use the invention and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the examples shown but is to be accorded the widest scope consistent with the claims.

One aspect of the present technology can provide a network device. During operation, the network device can receive, from a first hardware unit of the network device, a message indicating an operation to be performed at the network device. Here, the first hardware unit can include one or more processing resources distinct from the one or more processing resources of the network device. The network device can perform the operation at the network device based on information in the message. The network device can send an output of the operation to a second hardware unit of the network device that operates as a standby for the first hardware unit for facilitating high availability. The network device can then update the second hardware unit with the output of the operation to synchronize between the first and second hardware units via at least one of the one or more processing resources of the network device. Subsequently, the network device can provide, to the first hardware unit, an acknowledgment of the completion of the operation.

In a variation on this aspect, the network device can receive the message by receiving a first trigger from the first hardware unit. In response to the first trigger, the network device can obtain from an entry in a data structure in a memory of the network device, information associated with the message. The network device can then determine a location of the message in the memory based on the information in the entry and obtain the message from the location of the memory.

In a further variation, the network device can determine that an ownership of the entry is changed from the first hardware unit to the network device. The changing of the ownership can allow the network device to modify the entry.

In a further variation, the network device can change an acknowledgment flag in the entry to provide the acknowledgment to the first hardware unit. The network device can then issue a second trigger to the first hardware unit.

In a further variation, the network device can determine, based on a response flag in the entry, whether to generate a response. The network device can then store, in the memory, the response associated with the operation and indicate, in the entry, that a response has been generated.

In a further variation, the information associated with the message can include a protocol port number via which one or more applications running on the first hardware unit synchronize with the second hardware unit.

In a variation on this aspect, the network device can perform the operation by scheduling the operation at the network device and executing the operation at a scheduled time.

In a variation on this aspect, the operation can include a configuration change of the hardware of the network device. The network device can update the second hardware unit with the output of the operation by updating a state of the second hardware unit to correspond to the configuration change of the hardware of the network device.

In a variation on this aspect, the operation can include synchronizing an update to a first database of the first hardware unit with a second database of the second hardware unit. The network device can update the second hardware unit by updating the second database of the second hardware unit with the update.

Another aspect of the present technology can provide a first hardware unit of a network device. During operation, the first hardware unit can determine an operation to be performed at the network device. Here, the first hardware unit includes one or more processing resources distinct from the one or more processing resources of the network device. The first hardware unit can generate an entry in a data structure in a memory of the network device. The entry can include information associated with a message indicating the operation. The first hardware unit can place the message in the memory of the network device to cause the network device to update a second hardware unit of the network device with an output of the operation via at least one of the one or more processing resources of the network device. The second hardware unit can operate as a standby for the first hardware unit for facilitating high availability. The first hardware unit can then receive, via the memory, an acknowledgment of completion of the operation.

In a variation on this aspect, the first hardware unit can request for the entry in the data structure and include header information of the message in the entry. The first hardware unit can then issue a first trigger to the network device.

In a variation on this aspect, the first hardware unit can allocate a first location in the memory of the network device for the message. The first hardware unit can then copy the message to the first location of the memory.

In a variation on this aspect, the first hardware unit can change an ownership of the entry from the first hardware unit to the network device. Here, the changing of the ownership allows the network device to modify the entry.

In a variation on this aspect, the first hardware unit can receive a second trigger from the network device and determine, based on an acknowledgment flag in the entry, that the message is received by the network device.

In a variation on this aspect, the first hardware unit can set a response flag in the entry to indicate a response from the network device is expected. The first hardware unit can then allocate a second location in the memory of the network device for the response.

In a variation on this aspect, the operation can include one of: a configuration change of hardware of the network device and synchronizing an update to a first database of the first hardware unit with a second database of the second hardware unit.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware logic blocks or apparatus. These logic blocks or apparatus may include, but are not limited to, an application-specific integrated circuit (ASIC) chip, a field-programmable gate array (FPGA), a dedicated or shared processor that executes a particular software logic block or a piece of code at a particular time, and/or other programmable-logic devices now known or later developed. When the hardware logic blocks or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method, comprising:

receiving, by a processing resource of a network device from a first hardware unit within the network device, a message indicating an operation to be performed at the network device, wherein the first hardware unit includes a first processing resource distinct from the processing resource of the network device;

performing the operation at the processing resource of the network device based on information in the message;

sending an output of the operation to a second hardware unit within the network device that operates as a standby for the first hardware unit for facilitating high availability, wherein the second hardware unit includes a second processing resource distinct from the processing resource of the network device;

updating the second hardware unit with the output of the operation to synchronize between the first and second hardware units via the processing resource of the network device; and providing, to the first hardware unit from the processing resource of the network device, an acknowledgment of completion of the operation.

2. The method of claim 1, wherein receiving the message comprises:

receiving a first trigger from the first hardware unit;

in response to the first trigger, obtaining, from an entry in a data structure in a memory device of the network device, information associated with the message;

determining a location of the message in the memory device based on the information in the entry; and obtaining the message from the location of the memory device.

3. The method of claim 2, further comprising determining that an ownership of the entry is changed from the first hardware unit to the network device, wherein the changing of the ownership allows the network device to modify the entry.

4. The method of claim 2, further comprising:

changing an acknowledgment flag in the entry to provide the acknowledgment to the first hardware unit; and issuing a second trigger to the first hardware unit.

5. The method of claim 2, further comprising:

determining, based on a response flag in the entry, whether to generate a response;

storing, in the memory device, the response associated with the operation; and indicating, in the entry, that a response has been generated.

6. The method of claim 5, wherein the information associated with the message includes a protocol port number via which one or more applications running on the first hardware unit of the network device synchronize with the second hardware unit.

7. The method of claim 1, wherein performing the operation at the processing resource of the network device comprises:

scheduling the operation at the processing resource of the network device; and executing, by the processing resource of the network device, the operation at a scheduled time.

8. The method of claim 1, wherein the operation comprises a configuration change of hardware of the network device; and wherein updating the second hardware unit with the output of the operation comprises updating a state of the second hardware unit to correspond to the configuration change of the hardware of the network device.

9. The method of claim 1, wherein the operation comprises synchronizing an update to a first database of the first hardware unit with a second database of the second hardware unit; and wherein updating the second hardware unit comprises updating the second database of the second hardware unit with the update.

10. A non-transitory computer-readable storage medium storing instructions that when executed by a processing resource of a network device cause the processing resource to perform a method, the method comprising:

receiving, by the processing resource of the network device from a first hardware unit within the network device, a message indicating an operation to be performed at the network device, wherein the first hardware unit includes a first processing resource distinct from the processing resource of the network device;

performing the operation at the processing resource of the network device based on information in the message;

sending an output of the operation to a second hardware unit within the network device that operates as a standby for the first hardware unit for facilitating high availability, wherein the second hardware unit includes a second processing resource distinct from the processing resource of the network device;

updating the second hardware unit with the output of the operation to synchronize between the first and second hardware units via the processing resource of the network device; and providing, to the first hardware unit from the processing resource of the network device, an acknowledgment of completion of the operation.

11. The non-transitory computer-readable storage medium of claim 10, wherein receiving the message comprises:

receiving a first trigger from the first hardware unit;

in response to the first trigger, obtaining, from an entry in a data structure in a memory device of the network device, information associated with the message;

determining a location of the message in the memory device based on the information in the entry; and obtaining the message from the location of the memory device.

12. The non-transitory computer-readable storage medium of claim 11, wherein the method further comprises determining that an ownership of the entry is changed from the first hardware unit to the network device, wherein the changing of the ownership allows the network device to modify the entry.

13. The non-transitory computer-readable storage medium of claim 11, wherein the method further comprises:

determining, based on a response flag in the entry, whether to generate a response;

storing, in the memory device, the response associated with the operation; and indicating, in the entry, that a response has been generated.

* * * * *